(12) United States Patent
Behjati Najafabadi et al.

(10) Patent No.: US 12,456,940 B2
(45) Date of Patent: Oct. 28, 2025

(54) MODULATION SIGNAL GENERATION AVOIDING FORBIDDEN REGIONS

(71) Applicant: Infineon Technologies Austria AG, Villach (AT)

(72) Inventors: Hamid Behjati Najafabadi, Los Angeles, CA (US); Benjamin Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 190 days.

(21) Appl. No.: 18/497,533

(22) Filed: Oct. 30, 2023

(65) Prior Publication Data

US 2025/0141376 A1 May 1, 2025

(51) Int. Cl.
*H02P 1/04* (2006.01)
*H02P 7/29* (2016.01)

(52) U.S. Cl.
CPC ............ *H02P 7/29* (2013.01); *H02P 2201/11* (2013.01)

(58) Field of Classification Search
CPC ........................................................ H02P 7/29
USPC ..................................................... 318/400.17
See application file for complete search history.

(56) References Cited

U.S. PATENT DOCUMENTS

| | | | | |
|---|---|---|---|---|
| 6,172,579 B1 * | 1/2001 | Dacus | ................. | H03C 3/0991 |
| | | | | 455/260 |
| 6,728,380 B1 * | 4/2004 | Zhu | ....................... | H04B 15/02 |
| | | | | 381/86 |
| 2020/0059185 A1 * | 2/2020 | Eguchi | ..................... | H02P 21/24 |

* cited by examiner

*Primary Examiner* — Erick D Glass
(74) *Attorney, Agent, or Firm* — Banner & Witcoff Ltd.

(57) ABSTRACT

An apparatus for generating an applicable control signal, including: a control module operable to generate a reference control signal that avoids, but is effectively within, a forbidden region by alternating the reference control signal between upper and lower levels of the forbidden region; an error determination module operable to generate an error signal based on a difference between the reference control signal and the applicable control signal; and a compensation module operable to noise-shape the error signal to suppress a portion of the error signal resulting from avoiding the forbidden region, and to modify the reference control signal based on the noise-shaped error signal, wherein the modified reference control signal is output by the apparatus as the applicable control signal for generating a modulation signal.

20 Claims, 10 Drawing Sheets

FIG 2A
FIG 2B
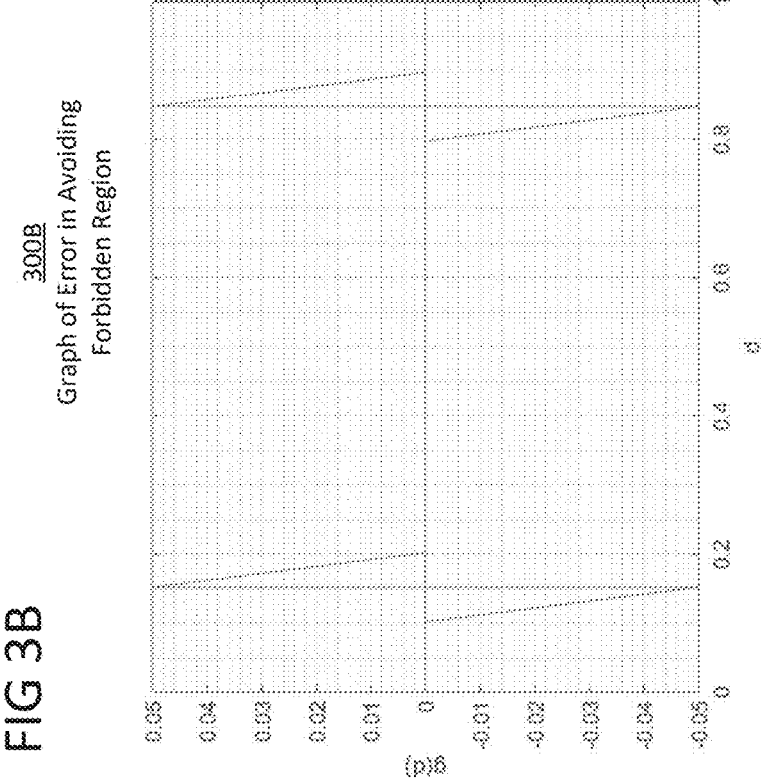
FIG 3A
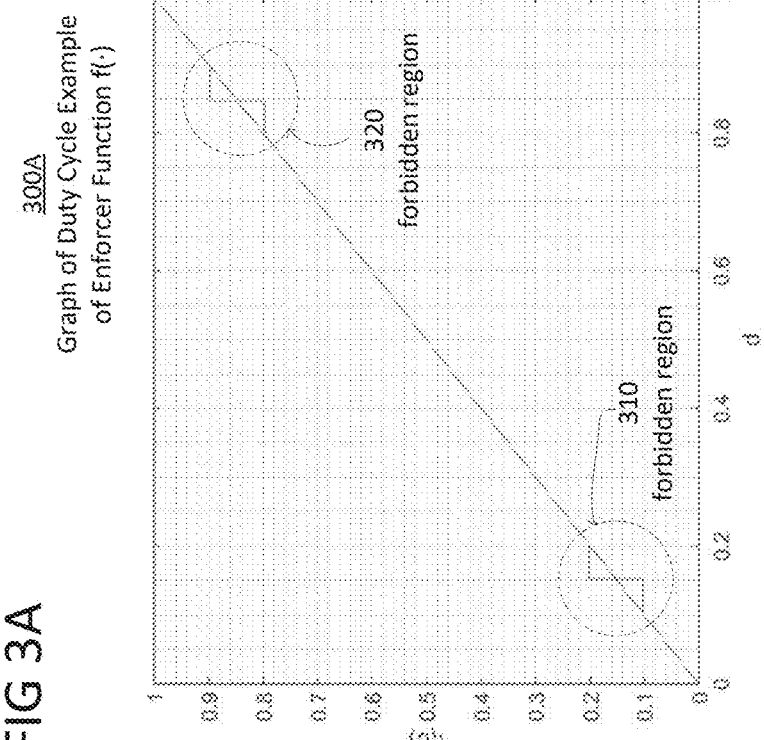
FIG 3B

MODULATION SIGNAL GENERATION AVOIDING FORBIDDEN REGIONS

BACKGROUND

Power electronic converters and motor drives are typically regulated using duty cycle and/or switching frequency control. Avoiding specific duty cycles or frequency ranges ensures proper operation. For instance, in motor drive inverters employing single shunt configuration, the analog-to-digital converter (ADC) sampling follows a specific pattern, necessitating that the duty cycles of different phases are not near one another.

Controllers are generally tasked with avoiding a designated "forbidden region." This avoidance can result in either a substantial, nonzero direct current (DC) error when regulating the converter's output or a significant error ripple as the control loop transitions slowly and unpredictably between the boundaries of this forbidden region. For instance, consider a motor drive with a single shunt configuration operating at zero speed. A nonzero steady-state error occurs when the command voltage vector falls within the forbidden region.

BRIEF DESCRIPTION OF THE FIGURES

FIG. 2A illustrates a timing diagram of an error signal when not in a forbidden region in accordance with aspects of the disclosure.

FIG. 2B illustrates a timing diagram of an error signal in a forbidden region in accordance with aspects of the disclosure.

FIG. 3A illustrates a graph of a duty cycle example of an enforcer function in accordance with aspects of the disclosure.

FIG. 3B illustrates a graph of an error in avoiding a forbidden region in accordance with aspects of the disclosure.

DETAILED DESCRIPTION

I. Overview

Power electronic converters and motor drives are typically controlled by duty cycle, switching frequency, or both. Certain duty cycles or frequency ranges should be avoided in some applications to ensure proper operation.

Figure 6A:
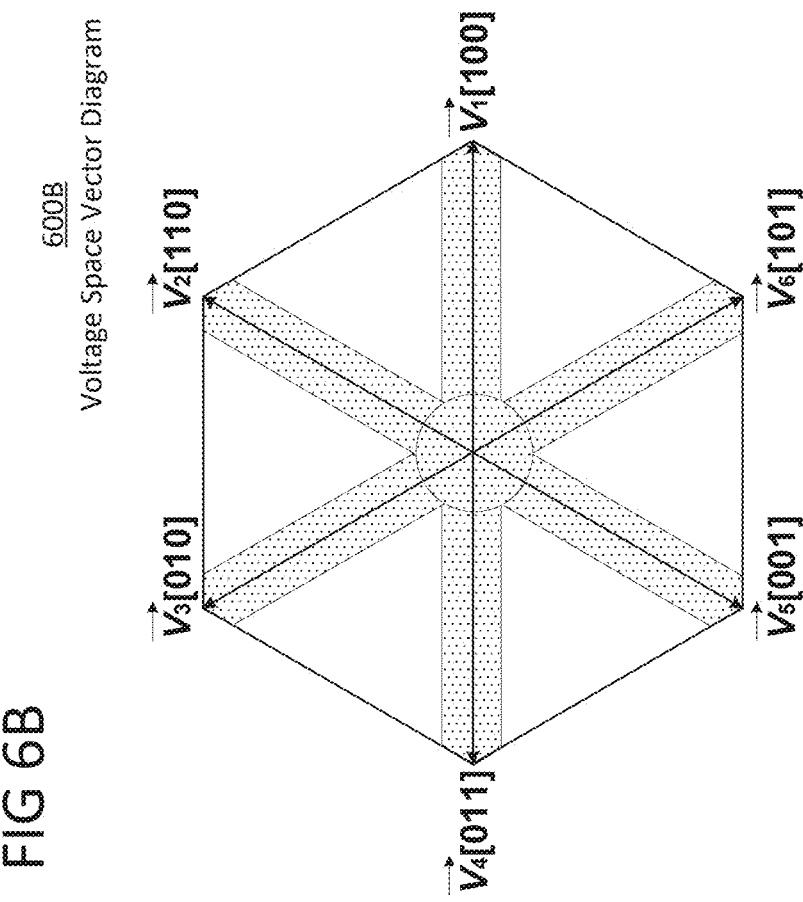
FIG. 6A illustrates a switching sequence diagram.
Figure 6B:
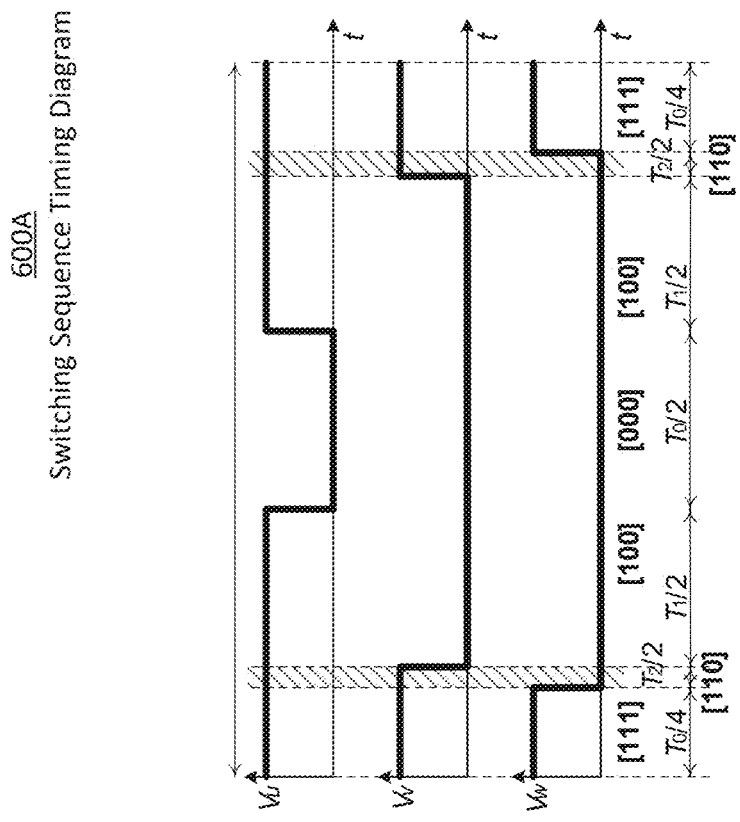
FIG. 6B illustrates a voltage space vector diagram.

FIGS. 6A and 6B illustrate the concept of a "forbidden region" within a space-vector-modulation hexagon of single-shunt motor drive inverters. FIG. 6A illustrates a switching sequence timing diagram 600A, while FIG. 6B illustrates a voltage space vector diagram 600B. Within the space-vector-modulation hexagon, a specific area is shaded to signify the forbidden region where the duty cycles (either $d_u^*$, $d_v^*$, or $d_w^*$) closely approach each other, leading to a situation where there is not enough time for ADC sampling to take place (e.g. switching state 600A). This shaded region is significant across different variables. For example, the shaded region may correspond to the forbidden regions in duty cycles $\{d_u^*, d_v^*, d_w^*\}$, phase-to-DC bus voltages $\{v_{uz}^*, v_{vz}^*, v_{wz}^*\}$, phase-to-neutral voltages $\{v_{un}^*, v_{vn}^*, v_{wn}^*\}$, or voltage angle $\{\theta\}$. These representations are all different ways of depicting the same forbidden region.

A. Forbidden Duty Cycle Regions

Assuming that the minimum time for ADC sampling is $T_{ADC}$ and the switching period is Ts, then the minimum duty cycle (e.g., the duty cycle of switching state in FIGS. 6A and 6B) can be expressed as:

$$D_{min} = \frac{T_{ADC}}{T_s}. \tag{1}$$

The corresponding forbidden region in the range of possible duty cycles is expressed as:

$$\begin{cases} d_x \in \left[\frac{1}{2}(1 + D_0 - D_{min}), \frac{1}{2}(1 + D_0 + D_{min})\right] \\ d_x \in \left[\frac{1}{2}(1 - D_0 - D_{min}), \frac{1}{2}(1 - D_0 + D_{min})\right] \end{cases}, \tag{2}$$

where $d_x$ can be any of $\{d_u, d_v, d_w\}$, and $D_0$ can be expressed as:

$$D_0 = \frac{\sqrt{3}\,V}{V_{dc}}\sin(\frac{\pi}{3} - \sin^{-1}(\frac{D_{min}V_{dc}}{\sqrt{3}\,V})). \tag{3}$$

B. Forbidden Phase-to-DC Bus Voltage Regions

The forbidden range of phase-to-dc-bus voltages can be expressed as:

$$\begin{cases} v_{xz}^* \in \left[\frac{V_{dc}}{2}(D_0 - D_{min}), \frac{V_{dc}}{2}(D_0 + D_{min})\right] \\ v_{xz}^* \in \left[\frac{-V_{dc}}{2}(D_0 + D_{min}), \frac{-V_{dc}}{2}(D_0 - D_{min})\right] \end{cases}, \tag{4}$$

where $v_{xz}^*$ is any of the $\{v_{uz}^*, v_{vz}^*, v_{wz}^*\}$.

C. Forbidden Phase-to-Neutral Voltage Regions

The forbidden range of phase-to-neutral voltages can be expressed as:

$$\begin{cases} v_{xn}^* \in \left[\dfrac{V_{dc}}{3}(D_0 - D_{min}), \dfrac{V_{dc}}{3}(D_0 + 2D_{min})\right] \\ v_{xn}^* \in \left[\dfrac{-V_{dc}}{2}(D_0 + 2D_{min}), \dfrac{-V_{dc}}{3}(D_0 - D_{min})\right] \end{cases} \quad (5)$$

where $v_{xn}^*$ is any of the $\{v_{un}^*, v_{vn}^*, v_{wn}^*\}$.

D. Forbidden Voltage Angle Regions

The forbidden voltage angle ranges can be expressed as:

$$\theta \in \left[\dfrac{k\pi}{3} - \dfrac{\theta_{min}}{2}, \dfrac{k\pi}{3} + \dfrac{\theta_{min}}{2}\right], k = \{0,1,2,3,4,5\}, \quad (6)$$

where:

$$\theta_{min} = 2\sin^{-1}\left(\dfrac{D_{min}V_{dc}}{\sqrt{3}\,V}\right). \quad (7)$$

Figure 6C:
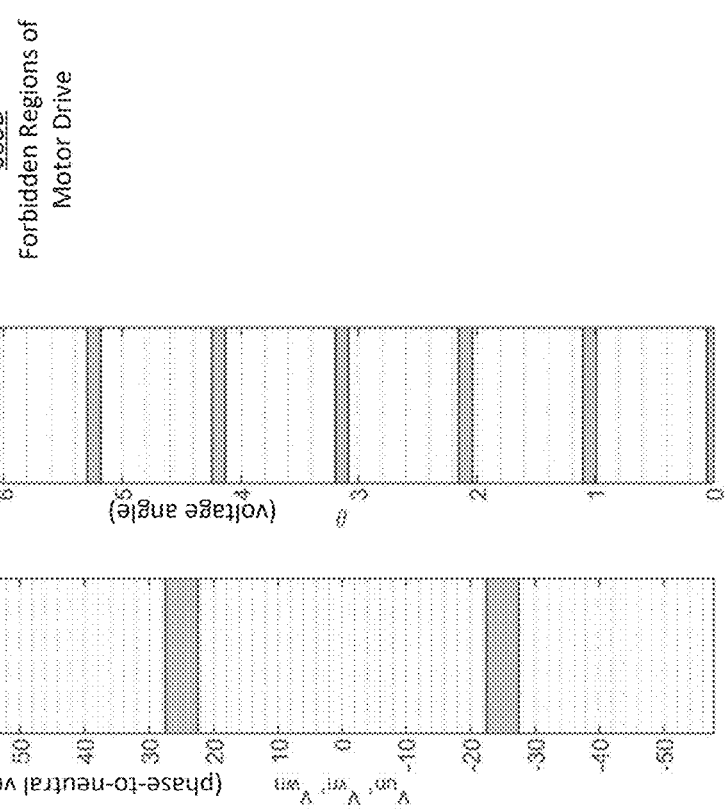
FIG. 6C illustrates a schematic diagram of a motor drive's voltage modulator.
Figure 6D:
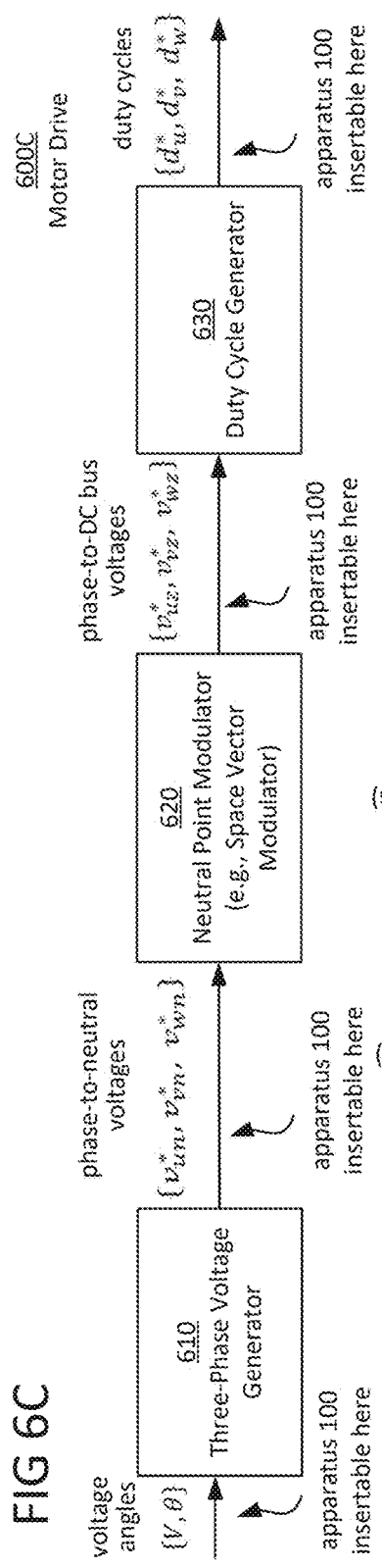
FIG. 6D illustrates forbidden regions in duty cycles, phase-to-dc-bus voltages, phase-to-neutral voltages, and voltage angle of the motor drive of FIG. 6C.

FIG. 6C illustrates a schematic diagram of a motor drive's voltage modulator 600C. FIG. 6D illustrates forbidden regions 600D in duty cycle, phase-to-dc-bus voltage, phase-to-neutral voltage, and voltage angle of the motor drive 600C of FIG. 6C.

The motor drive 600C comprises a three-phase voltage generator 610, a neutral point modulator 620, and a duty cycle generator 430. In this specific example, $D_{min}=0.05$, $V_{dc}=100V$, and $V=50V$. Without loss of generality, the aspects described herein may be applied to any of the duty cycle (downstream from the duty cycle generator 630), the phase-to-dc-bus voltage (downstream from the neutral point modulator 620), the phase-to-neutral voltage (downstream from the three-phase voltage generator 610), and the voltage angle (upstream from the three-phase voltage generator 610). As illustrated in FIG. 6C, an objective is to prevent the motor drive system from entering a forbidden region.

II. Generating Applicable Control Signal

The term "applicable control signal" may be a duty cycle control signal, a phase-to-DC-bus voltage control signal, a phase-to-neutral voltage control signal, or a voltage angle control signal, for example. The disclosure describes avoiding forbidden operational regions of possible duty cycle control signals. However, the same aspects apply to other variables, such as phase-to-DC-bus voltage control signals, phase-to-neutral voltage control signals, and/or voltage angle control signals.

Figure 1:
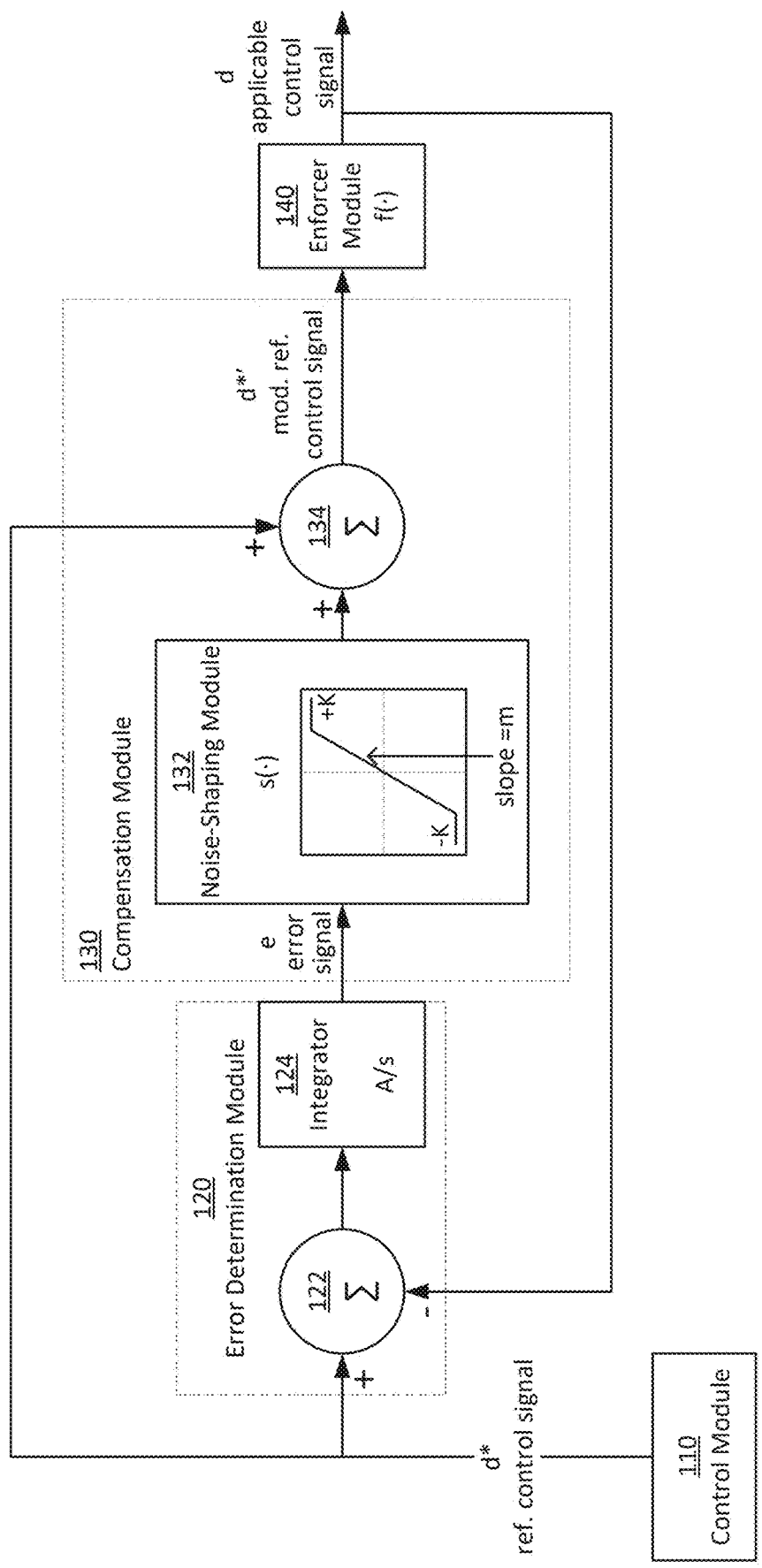
FIG. 1 illustrates an apparatus for generating an applicable control signal in accordance with aspects of the disclosure.

FIG. 1 illustrates apparatus 100 for generating an applicable control signal d in accordance with aspects of the disclosure. The applicable control signal d is based on a reference control signal d* that is modified to avoid, but is effectively within, a forbidden region between the upper and lower levels of the forbidden region.

The apparatus 100 for generating an applicable control signal d comprises a control module 110, an error determination module 120, a compensation module 130, and an enforcer module 140.

The error determination module 120 comprises adder 122 and integrator 124. The error determination module 120 is operable to generate an error signal e based on a difference between the reference control signal d* and the applicable control signal d, wherein the reference control signal d* is output by the control module 110. The adder 122 is operable to calculate the difference between the reference control signal d* and the applicable control signal d. The integrator 124 is operable to accumulate the difference to generate the error signal e.

The compensation module 130 is operable to noise-shape the error signal e to suppress a portion of the error signal e resulting from avoiding the forbidden region, and to modify the reference control signal d* based on the noise-shaped error signal.

FIG. 2A illustrates a timing diagram 200A of an error signal when it is not in a forbidden region. In contrast, FIG. 2B illustrates a timing diagram 200B of the error signal when it falls within the forbidden region. The compensation module 130 is operable to seamlessly switch between operating as a nonlinear switching regulator and a linear regulator, based on whether the reference control signal d* is effectively within or outside of the forbidden region.

The compensation module 130 comprises a noise-shaping module 132 and an adder 134. The noise-shaping module 132 is operable to non-linearly noise-shape the error signal e and has an adjustable slope m defining bandwidth and/or an adjustable saturation level (−K to +K) dictating the extent of the error suppression. The function s(·) is a nonlinear function with adjustable slope m and saturation level K. The values A, K, and m are constants set in accordance with design parameters. The higher the value of slope m, the more rapidly the error signal e oscillates back and forth. K is set to be greater than the maximum error to ensure system stability.

A feedforward path is configured to feed forward the reference control signal d*, and the adder 134 is operable to add the noise-shaped error signal and the reference control signal d* that has been fed forward, to output the modified reference control signal d*'. The modified reference control signal d*' is output by apparatus 100 as the applicable control signal d after being processed by the enforcer module 140. The applicable control signal d is used to generate a modulation signal, which may be a pulse width modulation (PWM) signal.

The enforcer module 140 is operable to avoid the forbidden region from the modified reference control signal d*'. To achieve this, the enforcer function ƒ(·) is a nonlinear function that removes the forbidden regions from the range of possible duty cycles. Without efforts to avoid the forbidden regions, there would be a linear relationship.

For example, FIG. 3A illustrates a graph 300A of a duty cycle control signal of an enforcer function ƒ(·), in particular, for a motor drive with $D_{min}=0.10$, $V_{dc}=100V$, and $V=50V$, with forbidden regions 310, 320. FIG. 3B illustrates a graph 300B of an auxiliary function g(·), representing an error created by avoiding the forbidden regions 310, 320. The two forbidden regions 310, 320 are interval 0.1-0.2 and interval 0.8-0.9, respectively. To actively avoid the forbidden regions, the error signal e remains at the lower threshold of the forbidden region for the first half of the interval. Then, the error signal e transitions to the upper threshold of the forbidden region. Symmetry in the error signal e is not necessary for maintaining the average value. Nevertheless, symmetry reduces the maximum error generated by the enforcer function ƒ(·) to half the width of the forbidden region. This, in turn, reduces the required saturation level K, which should be greater than maximum error e, as specified in Equation 9.

The auxiliary function g(·) represents the difference between the applicable duty cycle ƒ(d) and the actual duty cycle d values:

$$\begin{cases} g(d) = f(d) - d \\ \dfrac{D_{min}}{2} \le g(d) < \dfrac{D_{min}}{2} \end{cases}, \quad (8)$$

where $D_{min}$ is the width of the forbidden region. A condition for stability is represented as:

$$K > D_{min}/2. \quad (9)$$

Although simple and nonlinear, apparatus 100 is stable under all operating conditions. Nonlinear control theory based on the Lyapunov stability theorem may be used to analyze the behavior of this apparatus 100.

The Lyapunov function is defined as:

$$V = \frac{e^2}{2}. \quad (10)$$

From this definition, V is a positive definite function:

$$\begin{cases} \forall e \ne 0: & V > 0 \\ e = 0: & V = 0 \end{cases}. \quad (11)$$

Also, V is radially unbounded as expressed as:

$$e \to \infty \Leftrightarrow V \to \infty. \quad (12)$$

The derivative of V with respect to time is expressed as:

$$\dot{V} = e\dot{e}, \quad (13)$$

where $\dot{e}$ is expanded according to the schematic diagram in FIG. 1 as:

$$\dot{e} = A(d^* - d) = A(d^* - f(d^{*\prime})) = A(d^* - f(d^* + s(e))). \quad (14)$$

Now, function $f(\cdot)$ is expressed in terms of function $g(\cdot)$ to obtain:

$$\dot{e} = A(d^* - (d^* + s(e) + g(d^* + s(e)))) = -A(s(e) + g(d^* + s(e))). \quad (15)$$

Assuming the error signal e is greater than ($|e| \ge K/m$), $s(e) = K\,\mathrm{sgn}(e)$, and:

$$\dot{V} = e\dot{e} = \quad (16)$$
$$-Ae(K\,\mathrm{sgn}(e) + g(d^* + K\,\mathrm{sgn}(e))) = -A|e|\left(K + \underbrace{\mathrm{sgn}(e)g(d^* + K\,\mathrm{sgn}(e))}_{x}\right).$$

The variable x has a lower limit, which is:

$$-\frac{D_{min}}{2} \le x. \quad (17)$$

Therefore, V has an upper limit expressed as:

$$\dot{V} = -A|e|(K + x) \le -A|e|\left(K - \frac{D_{min}}{2}\right). \quad (18)$$

Referring to equation (18), it can be concluded that if K is large enough, $\dot{V}$ is a negative function, that is:

$$\forall K > \frac{D_{min}}{2} \Leftrightarrow \dot{V} < 0. \quad (19)$$

This means that by choosing a proper K, the error signal e decreases with time until it reaches K/m. Once the error signal e reaches K/m, the behavior of apparatus 100 depends on whether or not the reference control signal d* is in the forbidden region. If the reference control signal d* is not in the forbidden region, $$g(d + K\,\mathrm{sgn}(e)) = 0 \quad (20)$$

Therefore, equation (15) is written as:

$$\dot{e} = -A\left(\underbrace{s(e)}_{me} + \underbrace{g(d^* + s(e))}_{0}\right) = -Ame, \quad (21)$$

and $$\dot{V} = e\dot{e} = -Ame^2 \Rightarrow \dot{V} < 0. \quad (22)$$

Equation (22) proves that the error signal e decreases and asymptotically approaches zero as long as the reference control signal d* is not in the forbidden region. Apparatus 100 becomes a linear regulator and is no longer nonlinear in this condition. The linear system has a first-degree response with a cross-over frequency of $\omega_0 = Am$.

However, if the reference control signal d* is inside the forbidden region, apparatus 100 becomes a nonlinear switching regulator. This nonlinear switching regulator switches back and forth between the upper and lower edges of the forbidden region, as shown in FIG. 2B, to create an average that is inside the forbidden region. Therefore, apparatus 100 may be considered a blue noise injector that regulates the output in an average sense even if the input reference control signal d* is in the forbidden region.

Figure 4A:
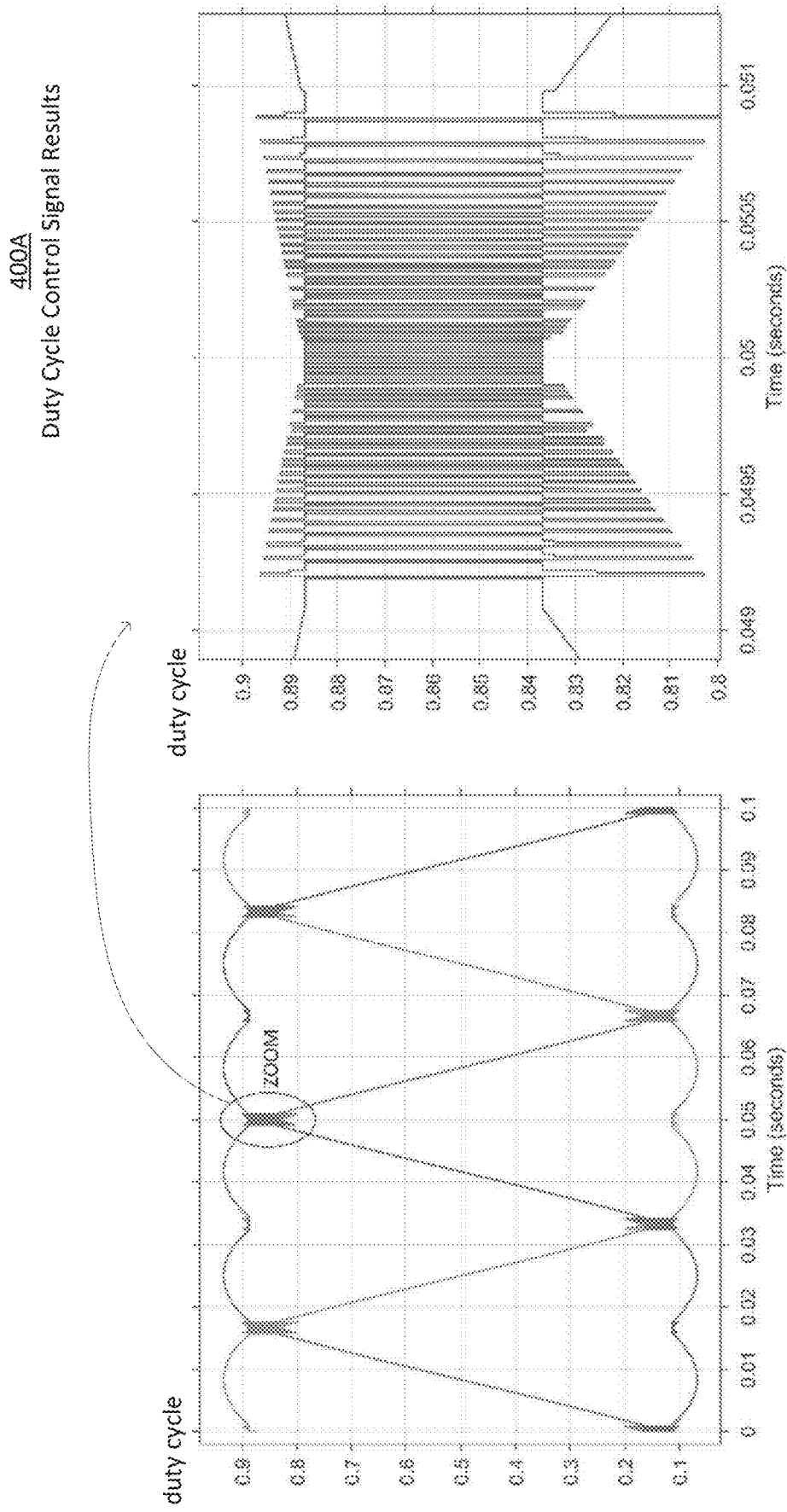
FIG. 4A illustrates duty cycle control signal results in accordance with aspects of the disclosure.
Figure 4B:
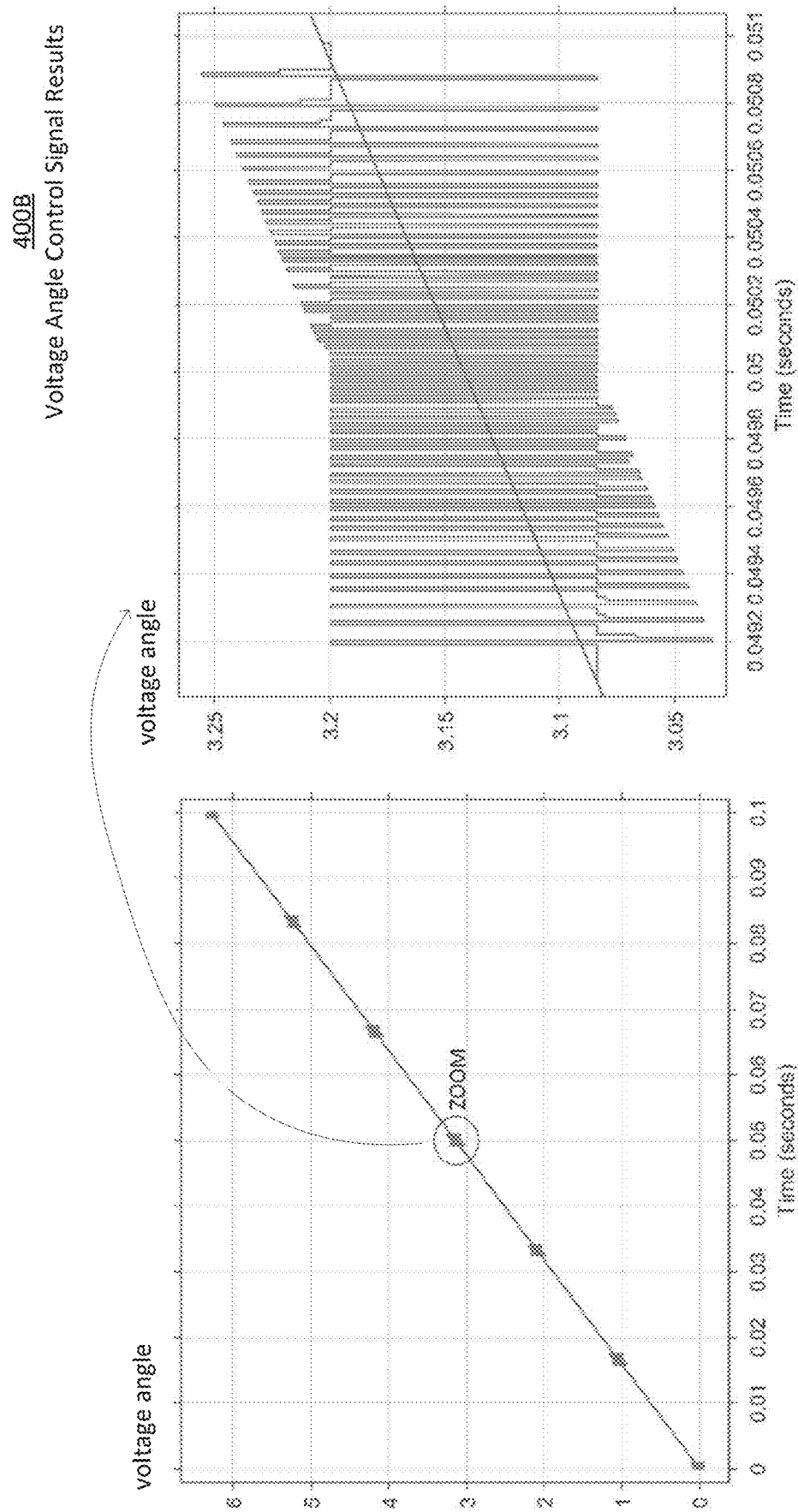
FIG. 4B illustrates voltage angle control signal results in accordance with aspects of the disclosure.
Figure 4C:
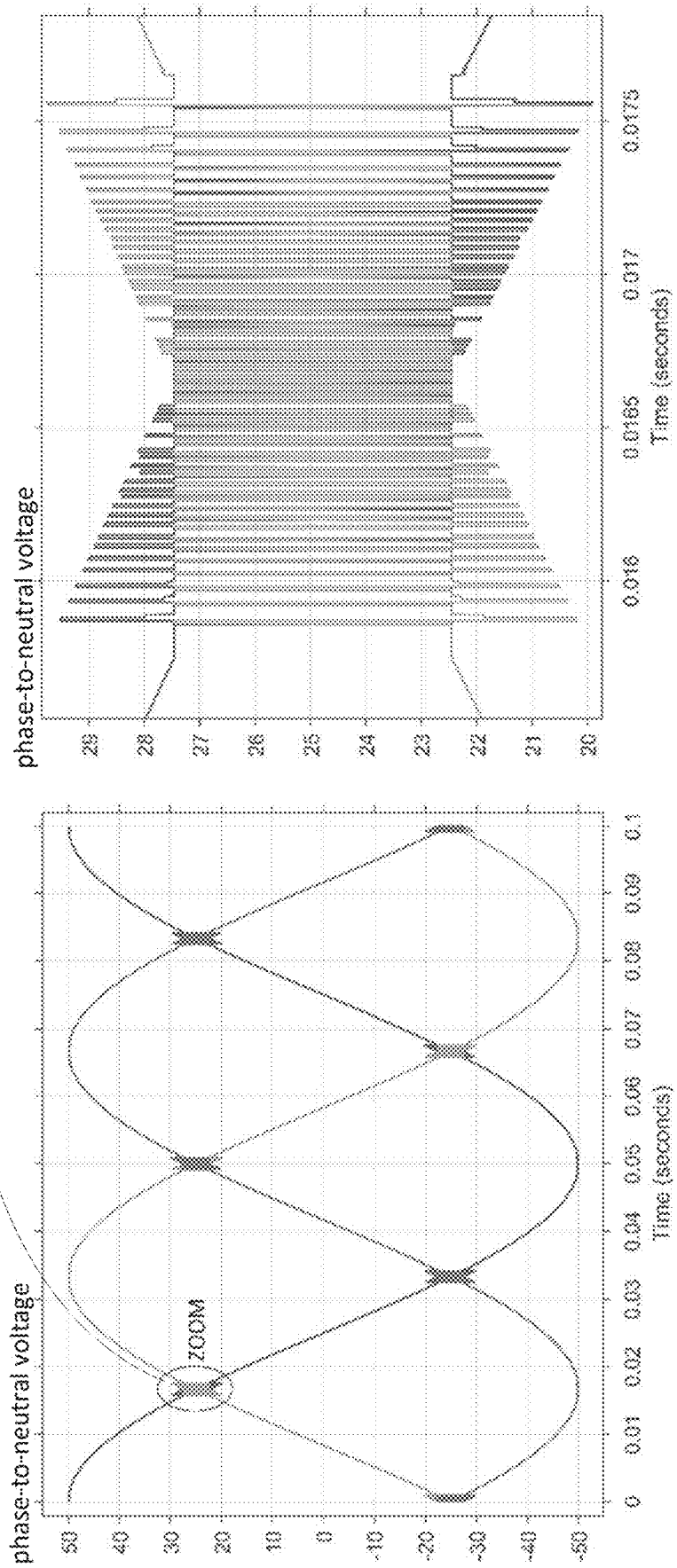
FIG. 4C illustrates phase-to-neutral voltage in accordance with aspects of the disclosure.
Figure 4D:
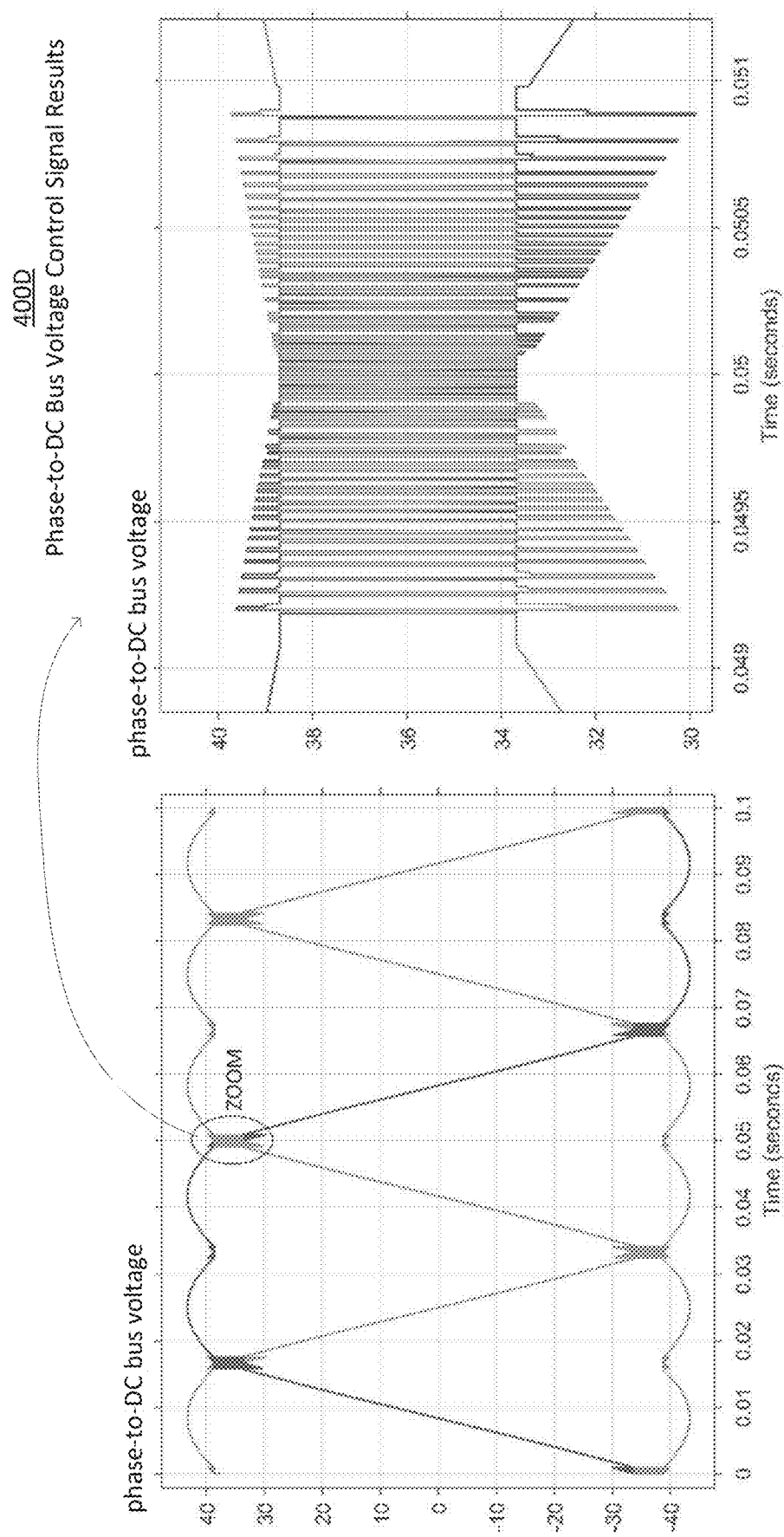
FIG. 4D illustrates phase-to-DC bus voltage control signal results in accordance with aspects of the disclosure.

FIGS. 4A-4D show example waveforms for $D_{min}=0.05$, $V_{dc}=100V$, and $V=50V$ in accordance with aspects of the disclosure. FIG. 4A illustrates the results 400A when a control signal is a duty cycle control signal for modulated duty cycle waveforms, $\{d_u, d_v, d_w\}$. FIG. 4B illustrates the results 400B when a control signal is a voltage angle control signal for modulated angle waveforms, $\theta$. FIG. 4C illustrates the results 400C when a control signal is a phase-to-neutral voltage control signal for modulated phase-to-neutral waveforms, $\{v_{un}, v_{vn}, v_{wn}\}$. FIG. 4D illustrates the results 400D when a control signal is a phase-to-DC bus voltage control signal for modulated phase-to-dc-bus waveforms, $\{v_{uz}, v_{vz}, v_{wz}\}$.

The waveforms are shown in FIGS. 4A-4D, on the right side, represent an enlarged view of a segment from the waveform on the left side. This close-up provides detailed insight into the waveform behavior when the reference control signal d* falls within the forbidden region. Taking FIG. 4A as an illustrative example, when the reference duty cycle control signal d* resides outside the forbidden region, the corresponding duty cycle control signal d exhibits a linear response. In contrast, when the reference duty cycle control signal d* falls within the forbidden region—specifically, between 0.8 and 0.9, as well as between 0.1 and 0.2—the control loop causes the applicable duty cycle to oscillate automatically to result in an averaged applicable duty cycle d over time.

It is worth explicitly noting that motor control commonly employs three-phase drives. Consequently, there are three PWM generators and three distinct duty cycle control signals, all having the same forbidden regions. However, these forbidden regions do not overlap simultaneously. Instead, there is control over the phase relationship between the three duty cycle control signals.

II. DC-DC Converter Examples

In a direct current-to-direct current converter (DC-to-DC converter), apparatus 100 operates as the front end of a hybrid digital pulse width modulator (PWM) 500A. Its role is to adjust a reference control signal d* (or reference PWM control signal) to the corresponding applicable control signal d (or applicable PWM control signal) to prevent operation within the forbidden regions.

Figure 5A:
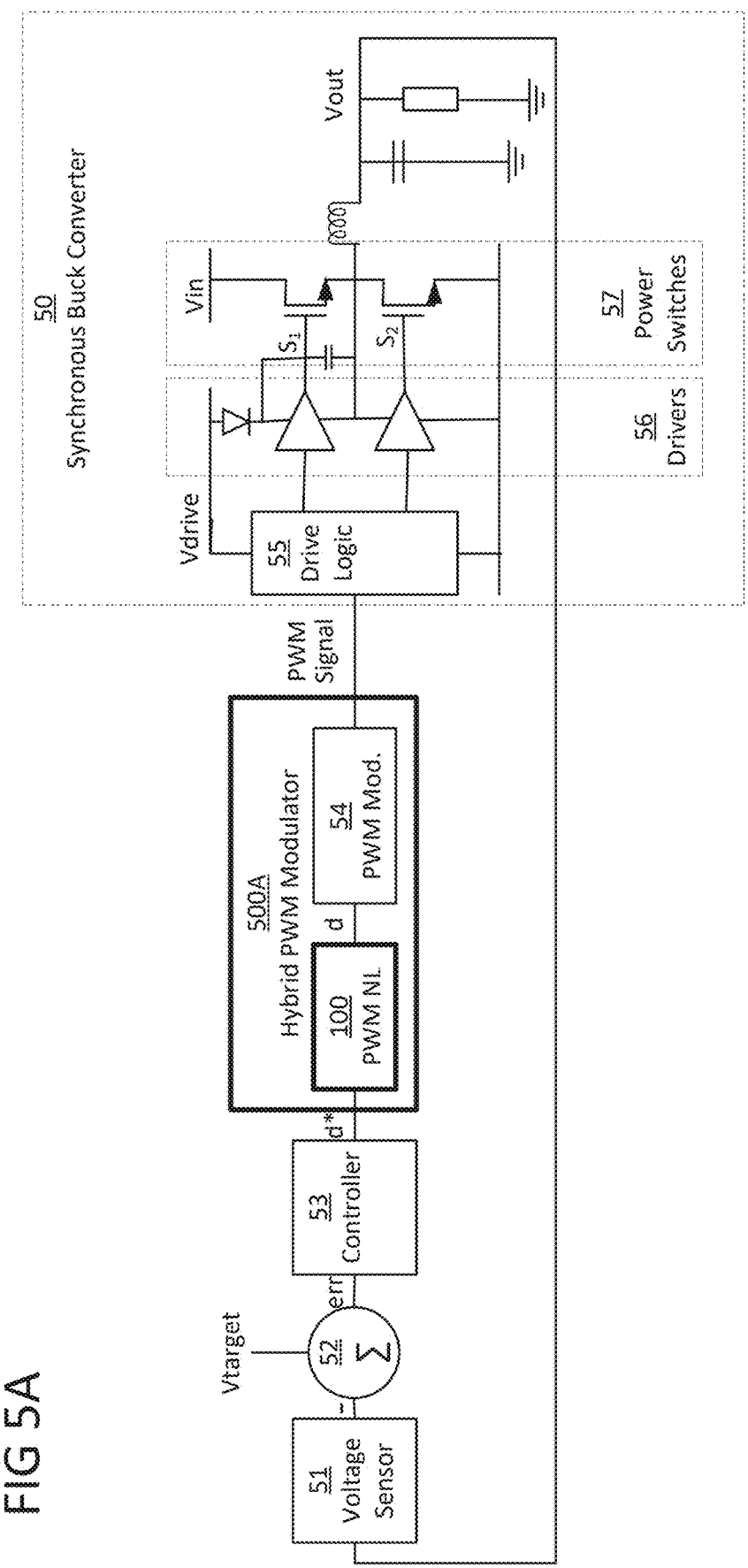
FIG. 5A illustrates a schematic diagram of a hybrid pulse width modulator (PWM) module applied to a synchronous Buck converter in accordance with aspects of the disclosure.

FIG. 5A illustrates a schematic diagram of a hybrid PWM modulator 500A coupled to a power converter 50. In this example, the power converter 50 is a DC-to-DC converter, specifically a synchronous Buck converter 50. However, it is noted that the disclosure is not limited in this regard. Alternatively, the power converter could be a multi-level Buck converter.

The hybrid PWM modulator 500A can be utilized in digital controllers to improve performance in situations characterized by narrow and negative current pulse conditions, as further elaborated below with respect to FIGS. 5B-5D. Unlike those experienced with respect to motors within their optimal operating range, these conditions typically represent corner conditions encountered during startup and significant transient events.

The hybrid PWM modulator 500A comprises two main components: apparatus 100 for generating an applicable control signal d, as shown in FIG. 1, and a PWM signal generation modulator 54 operable to generate a PWM signal based on the applicable control signal d. Apparatus 100 is operable to automatically switch between operating as a nonlinear switching regulator and a linear regulator. This mode switching depends on whether the reference control signal d* falls within or outside the forbidden region, as discussed in earlier sections of this disclosure.

The power converter 50 is coupled to the hybrid PWM modulator 500A, and is operable to convert an input voltage to a modulated output voltage Vout based on the PWM signal. The power converter 50 may operate as a single-phase or multi-phase converter, with modulation options including CCM (continuous conduction mode) or DCM (discontinuous conduction mode), and with voltage or current mode control. Additionally, the frequency may be fixed or variable.

The noise modulation/control implemented by the hybrid PWM modulator 500A effectively suppresses the introduction of significant error signals into the control loop. The control loop comprises voltage sensor 51, adder 52, and controller 53. The voltage sensor 51 is operable to monitor the output voltage Vout. The adder 52 is operable to determine a difference between the sensed voltage and a target voltage Vtarget. The controller 53 is operable to generate a reference control signal d* for modulation by the hybrid PWM modulator 500A. The details of these control loop elements are well-established and, therefore, require no further elaboration.

The synchronous Buck converter 50 comprises elements including drive logic 55, driver 56, and power switches 57. These elements are well-established and are not elaborated upon further for the sake of conciseness.

Figure 5B:
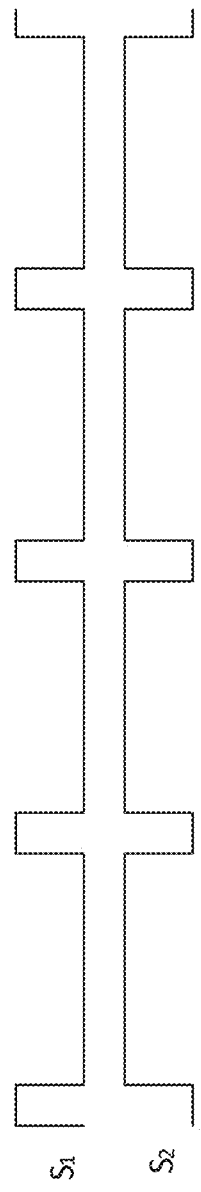
FIG. 5B illustrates PWM control signals under nominal (CCM) conditions.

FIG. 5B illustrates PWM control signals 500B during nominal CCM conditions. The apparatus 100 for generating an applicable control signal d accommodates minimum, skipped, and negative pulses within its modulation scheme for conditions of low output voltage Vout and low output current Iout, while maintaining synchronous operation at a fixed frequency. $S_1$ and $S_2$ are the driver signals of FIG. 5A.

Figure 5C:
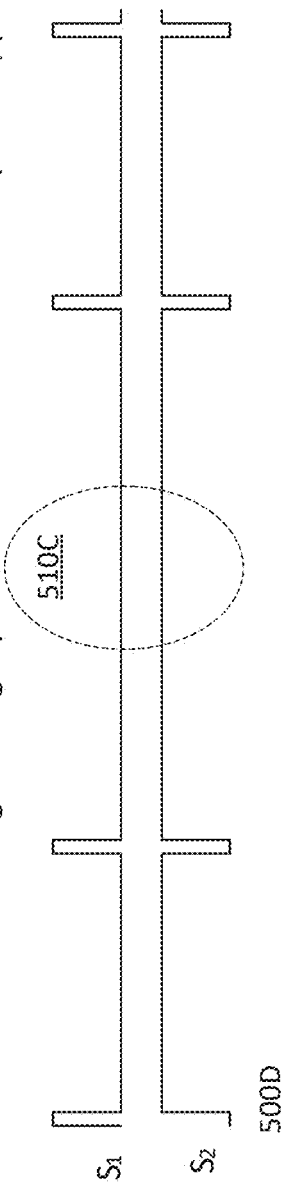
FIG. 5C illustrates PWM control signals large quantization effect at minimum (narrow) pulse width.

FIG. 5C illustrates PWM control signals 500C exhibiting a significant quantization effect at their minimum (narrowest) pulse width. For conditions of low output voltage Vout, and the requirement is to operate with narrow and skipped pulses 510C, a constraint exists on the minimum pulse width. When the pulse width of the reference control signal d* becomes too narrow, the digital hardware faces limitations in its ability to apply these pulses due to the necessity for the drivers 56 to undergo a certain time duration to transition on and off.

The hybrid PWM modulator 500A addresses this challenge by storing the error for utilization in the subsequent cycle, effectively compensating for the narrow pulse that could not be generated initially. As a result, on average, the hybrid PWM modulator 500A achieves the desired pulse width.

Figure 5D:
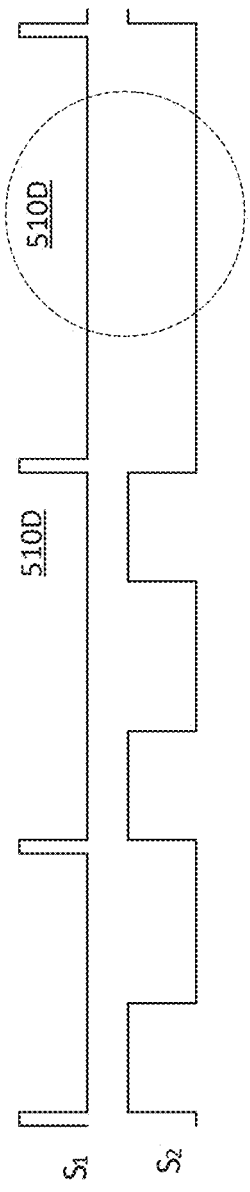
FIG. 5D illustrates PWM control signals under DCM with negative and skip pulses.

FIG. 5D illustrates PWM control signals 500D under DCM conditions with the pulse width minimized and positive, negative, and skipped pulses 510D at low output current Iout. In certain PWM modulators 54, generating a negative pulse is not feasible due to the inability to produce a negative current. Furthermore, there may be a maximum pulse width constraint within the PWM modulators 54. In these cases, there are regions in which the PWM signal cannot track the reference control signal d*, making it challenging to implement arbitrary pulse widths.

The hybrid PWM modulator 500A overcomes such limitations. For example, suppose the minimum duty cycle is 0.1 and the reference duty system d* is 0.001. In that case, the reference value can be achieved on average by allowing the duty cycle value to oscillate between 0.0 and 0.1.

Another potential application involves using a resonant converter, where the control signal is employed for switching frequency control. The principles outlined in this disclosure can potentially be relevant to various systems incorporating switching mechanisms.

The term "module" should not be construed as a limiting factor in the scope of the disclosure. The use of the term "module" encompasses implementations and functionalities within the context of a processor or controller, such as a digital controller. This includes, but is not limited to, firmware embedded within the controller. The terms "processor" or "controller" as, for example, used herein may be understood as any kind of technological entity that allows handling of data. The data may be handled according to one or more specific functions executed by the processor or controller.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

The techniques of this disclosure may also be described in the following examples.

Example 1. An apparatus for generating an applicable control signal, comprising: a control module operable to generate a reference control signal that avoids, but is effectively within, a forbidden region by alternating the reference control signal between upper and lower levels of the forbidden region; an error determination module operable to generate an error signal based on a difference between the reference control signal and the applicable control signal; and a compensation module operable to noise-shape the error signal to suppress a portion of the error signal resulting from avoiding the forbidden region, and to modify the reference control signal based on the noise-shaped error signal, wherein the modified reference control signal is output by the apparatus as the applicable control signal for generating a modulation signal.

Example 2. The apparatus of example 1, further comprising: an enforcer module operable to avoid the forbidden region from the modified reference control signal.

Example 3. The apparatus of any one or more of examples 1-2, wherein the compensation module comprises: a noise-shaping module operable to noise-shape the error signal, wherein the noise-shaping module is a nonlinear noise-shaping module having an adjustable slope defining bandwidth and/or an adjustable saturation level.

Example 4. The apparatus of any one or more of examples 1-3, wherein the apparatus is operable to automatically switch between operating as a nonlinear switching regulator and a linear regulator based on whether the reference control signal is effectively within or outside of the forbidden region.

Example 5. The apparatus of any one or more of examples 1-4, further comprising: a feedforward path operable to feed forward the reference control signal; and an adder operable to add the noise-shaped error signal and the reference control signal that was fed forward, to output the modified reference control signal.

Example 6. The apparatus of any one or more of examples 1-5, wherein the error determination module comprises: an integrator operable to accumulate the difference between the reference control signal and the applicable control signal to generate the error signal.

Example 7. The apparatus of any one or more of examples 1-6, wherein the applicable control signal is a duty cycle control signal, a phase-to-direct current (DC) bus voltage control signal, a phase-to-neutral voltage control signal, or a voltage angle control signal.

Example 8. A motor drive controller, comprising: the apparatus of any one or more of examples 1-7, wherein the applicable control signal is a duty cycle control signal and the modulation signal is a pulse width modulation (PWM) signal.

Example 9. A motor drive controller, comprising: the apparatus of any one or more of examples 1-8; a voltage generator operable to generate a phase-to-neutral voltage signal based on a voltage angle signal; a neutral point modulation module operable to generate a phase-to-direct current (DC) bus voltage signal based on the phase-to-neutral voltage signal; and a duty cycle generator operable to generate a duty cycle signal based on the phase-to DC bus voltage signal, wherein the reference control signal is the voltage angle signal, the phase-to-neutral voltage signal, the phase-to-direct current (DC) bus voltage signal, or the duty cycle signal.

Example 10. An apparatus, comprising: a hybrid pulse width modulation (PWM) module, comprising: the apparatus of any one or more of examples 1-9, which is operable to automatically switch between operating as a nonlinear switching regulator and a linear regulator based on whether the reference control signal is effectively within or outside of the forbidden region; and a PWM signal generation module operable to generate a PWM signal based on the applicable control signal; and a power converter coupled to the hybrid PWM module, and operable to convert an input voltage to an output voltage based on the generated PWM signal.

Example 11. The apparatus of example 10, wherein the power converter is a direct current-to-direct current converter (DC-to-DC converter).

Example 12. The apparatus of example 11, wherein the DC-to-DC converter is a synchronous buck converter.

Example 13. The apparatus of example 10, wherein the applicable control signal is a duty cycle control signal or a switching frequency control signal.

Example 14. An method for generating an applicable control signal, comprising: generating, by a control module, a reference control signal that avoids, but is effectively within, a forbidden region by alternating the reference control signal between upper and lower levels of the forbidden region; generating, by an error determination module, an error signal based on a difference between the reference control signal and the applicable control signal; noise-shaping, by a compensation module, the error signal to suppress a portion of the error signal resulting from avoiding the forbidden region; modifying, by the compensation module, the reference control signal based on the noise-shaped error signal; and outputting the modified reference control signal as the applicable control signal for generating a modulation signal.

Example 15. The method of example 14, further comprising: avoiding, by an enforcer module, the forbidden region from the modified reference control signal.

Example 16. The method of any one or more of examples 14-15, wherein the noise-shaping is nonlinear noise-shaping based on an adjustable slope defining bandwidth and/or an adjustable saturation level.

Example 17. The method of any one or more of examples 14-16, further comprising: the method automatically and seamlessly switching between a nonlinear switching regulation method and a linear regulation method based on whether the reference control signal is effectively within or outside of the forbidden region.

Example 18. The method of any one or more of examples 14-17, further comprising: feeding forward the reference control signal; and adding, by an adder, the noise-shaped error signal and the reference control signal that was fed forward, and outputting the modified reference control signal.

Example 19. The method of any one or more of examples 14-18, wherein the generating the error signal comprises: accumulating, by an integrator, the difference between the reference control signal and the applicable control signal.

Example 20. A power conversion method, comprising: the method of any one or more of examples 14-19; generating, by a pulse width modulation (PWM) signal generation module, a PWM signal based on the applicable control signal; and converting, by a power converter coupled to the PWM signal generation module, an input voltage to an output voltage based on the generated PWM signal.

While the foregoing has been described in conjunction with exemplary aspects, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present disclosure. This disclosure is intended to cover any adaptations or variations of the specific aspects discussed herein.

What is claimed is:

1. An apparatus for generating an applicable control signal, comprising:
    a control module operable to generate a reference control signal that avoids, but is effectively within, a forbidden region by alternating the reference control signal between upper and lower levels of the forbidden region;
    an error determination module operable to generate an error signal based on a difference between the reference control signal and the applicable control signal; and
    a compensation module operable to noise-shape the error signal to suppress a portion of the error signal resulting from avoiding the forbidden region, and to modify the reference control signal based on the noise-shaped error signal,
    wherein the modified reference control signal is output by the apparatus as the applicable control signal for generating a modulation signal.

2. The apparatus of claim 1, further comprising:
    an enforcer module operable to avoid the forbidden region from the modified reference control signal.

3. The apparatus of claim 1, wherein the compensation module comprises:
    a noise-shaping module operable to noise-shape the error signal,
    wherein the noise-shaping module is a nonlinear noise-shaping module having an adjustable slope defining bandwidth and/or an adjustable saturation level.

4. The apparatus of claim 1, wherein the apparatus is operable to automatically switch between operating as a nonlinear switching regulator and a linear regulator based on whether the reference control signal is effectively within or outside of the forbidden region.

5. The apparatus of claim 1, further comprising:
    a feedforward path operable to feed forward the reference control signal; and
    an adder operable to add the noise-shaped error signal and the reference control signal that was fed forward, to output the modified reference control signal.

6. The apparatus of claim 1, wherein the error determination module comprises:
    an integrator operable to accumulate the difference between the reference control signal and the applicable control signal to generate the error signal.

7. The apparatus of claim 1, wherein the applicable control signal is a duty cycle control signal, a phase-to-direct current (DC) bus voltage control signal, a phase-to-neutral voltage control signal, or a voltage angle control signal.

8. A motor drive controller, comprising:
    the apparatus of claim 1,
    wherein the applicable control signal is a duty cycle control signal and the modulation signal is a pulse width modulation (PWM) signal.

9. A motor drive controller, comprising:
    the apparatus of claim 1;
    a voltage generator operable to generate a phase-to-neutral voltage signal based on a voltage angle signal;
    a neutral point modulation module operable to generate a phase-to-direct current (DC) bus voltage signal based on the phase-to-neutral voltage signal; and
    a duty cycle generator operable to generate a duty cycle signal based on the phase-to DC bus voltage signal,
    wherein the reference control signal is the voltage angle signal, the phase-to-neutral voltage signal, the phase-to-direct current (DC) bus voltage signal, or the duty cycle signal.

10. An apparatus, comprising:
    a hybrid pulse width modulation (PWM) module, comprising:
        the apparatus of claim 1, which is operable to automatically switch between operating as a nonlinear switching regulator and a linear regulator based on whether the reference control signal is effectively within or outside of the forbidden region; and
        a PWM signal generation module operable to generate a PWM signal based on the applicable control signal; and
    a power converter coupled to the hybrid PWM module, and operable to convert an input voltage to an output voltage based on the generated PWM signal.

11. The apparatus of claim 10, wherein the power converter is a direct current-to-direct current converter (DC-to-DC converter).

12. The apparatus of claim 11, wherein the DC-to-DC converter is a synchronous buck converter.

13. The apparatus of claim 10, wherein the applicable control signal is a duty cycle control signal or a switching frequency control signal.

14. An method for generating an applicable control signal, comprising:
    generating, by a control module, a reference control signal that avoids, but is effectively within, a forbidden region by alternating the reference control signal between upper and lower levels of the forbidden region;

generating, by an error determination module, an error signal based on a difference between the reference control signal and the applicable control signal;

noise-shaping, by a compensation module, the error signal to suppress a portion of the error signal resulting from avoiding the forbidden region;

modifying, by the compensation module, the reference control signal based on the noise-shaped error signal; and outputting the modified reference control signal as the applicable control signal for generating a modulation signal.

15. The method of claim 14, further comprising:
avoiding, by an enforcer module, the forbidden region from the modified reference control signal.

16. The method of claim 14, wherein the noise-shaping is nonlinear noise-shaping based on an adjustable slope defining bandwidth and/or an adjustable saturation level.

17. The method of claim 14, further comprising:
the method automatically and seamlessly switching between a nonlinear switching regulation method and a linear regulation method based on whether the reference control signal is effectively within or outside of the forbidden region.

18. The method of claim 14, further comprising:
feeding forward the reference control signal; and
adding, by an adder, the noise-shaped error signal and the reference control signal that was fed forward, and outputting the modified reference control signal.

19. The method of claim 14, wherein the generating the error signal comprises:
accumulating, by an integrator, the difference between the reference control signal and the applicable control signal.

20. A power conversion method, comprising:
the method of claim 14;
generating, by a pulse width modulation (PWM) signal generation module, a PWM signal based on the applicable control signal; and
converting, by a power converter coupled to the PWM signal generation module, an input voltage to an output voltage based on the generated PWM signal.

* * * * *